United States Patent
Wang et al.

(10) Patent No.: US 10,861,222 B2
(45) Date of Patent: Dec. 8, 2020

(54) INFORMATION INTERACTION METHOD, DEVICE, AND SYSTEM

(71) Applicant: TENCENT TECHNOLOGY (SHENZHEN) COMPANY LIMITED, Guangdong (CN)

(72) Inventors: Li Wang, Guangdong (CN); Wei Zhang, Guangdong (CN); Xiao Wei Xia, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 325 days.

(21) Appl. No.: 15/774,377

(22) PCT Filed: Mar. 2, 2017

(86) PCT No.: PCT/CN2017/075433
§ 371 (c)(1),
(2) Date: May 8, 2018

(87) PCT Pub. No.: WO2017/148410
PCT Pub. Date: Sep. 8, 2017

(65) Prior Publication Data
US 2020/0250881 A1    Aug. 6, 2020

(30) Foreign Application Priority Data
Mar. 3, 2016    (CN) .......................... 2016 1 0120316

(51) Int. Cl.
*G06T 15/08*    (2011.01)
*G06T 15/20*    (2011.01)
*H04N 21/2187*    (2011.01)

(52) U.S. Cl.
CPC ............ *G06T 15/205* (2013.01); *G06T 15/08* (2013.01); *H04N 21/2187* (2013.01)

(58) Field of Classification Search
CPC .... G06T 15/205; G06T 15/08; H04N 21/2187
See application file for complete search history.

(56) References Cited

U.S. PATENT DOCUMENTS 7,222,150 B1 *   5/2007   Phillips .................. H04L 29/06
                                               709/202
2015/0356063 A1*  12/2015  Jiang ...................... H04L 67/38
                                               715/232

FOREIGN PATENT DOCUMENTS

CN    104025586 A    9/2014
CN    104469440 A    3/2015
(Continued)

OTHER PUBLICATIONS

Machine translated, CN104618797 (Year: 2015).*
(Continued)

*Primary Examiner* — Sing-Wai Wu
(74) *Attorney, Agent, or Firm* — Sughrue Mion, PLLC

(57) ABSTRACT

A method, user equipment and system are provided. The method includes presenting, on a user equipment, a 3D application including a 3D community that includes an analog object and a virtual screen. Video content of another user equipment is obtained from a video source server, and presented on the virtual screen. Interaction information generated according to an interaction request from the another user equipment is received from a 3D application server, and an object corresponding to the interaction information is rendered in the 3D community according to the interaction information.

18 Claims, 9 Drawing Sheets

(56) References Cited

FOREIGN PATENT DOCUMENTS

| | | |
|---|---|---|
| CN | 104618797 A | 5/2015 |
| CN | 105610868 A | 5/2016 |
| EP | 2 383 696 A1 | 11/2011 |
| KR | 10-2011-0137439 A | 12/2011 |

OTHER PUBLICATIONS

International Search Report for PCT/CN2017/075433 dated May 26, 2017 [PCT/ISA/210].
Communication dated Nov. 19, 2019, issued by the Korean Intellectual Property Office in corresponding Korean Application No. 10-2018-7015519.
Communication dated May 20, 2019, issued by the Korean Intellectual Property Office in corresponding Korean Application No. 10-2018-7015519.
Communication dated Apr. 15, 2019, from the State Intellectual Property Office of People's Republic of China in counterpart Application No. 201610120316.3.

* cited by examiner

INFORMATION INTERACTION METHOD, DEVICE, AND SYSTEM

CROSS-REFERENCE TO RELATED APPLICATIONS

This application is a National Stage entry of International Patent Application No. PCT/CN2017/075433 filed on Mar. 2, 2017, which claims priority from Chinese Patent Application No. 201610120316.3, entitled "INFORMATION INTERACTION METHOD, DEVICE, AND SYSTEM", and filed with the Patent Office of China on Mar. 3, 2016, the disclosures of which are incorporated by reference herein in their entirety.

FIELD

The present disclosure relates to the field of three dimensional (3D) technologies, and specifically, to an information interaction method, a device, and a system.

BACKGROUND

An interactive application involving a three-dimensional (3D) scenario in the related art technology is already very popular. A 3D application system usually includes a user equipment and a 3D application server. The user equipment may obtain data of the interactive application from the 3D application server, and present the interactive application.

An anchor video by means of live broadcast on the Internet in the related art technology is also already very popular. However, in the related art live broadcast, an anchor can communicate with a user only by way of words on a corresponding live broadcasting platform, and the communication cannot be combined with a 3D application.

SUMMARY

It is an aspect to provide an information interaction method in which an anchor may interact with the audience in a 3D community in a 3D application, thereby increasing the diversity of interaction.

It is another aspect to provide a corresponding user equipment, server, and system.

According to an aspect of one or more exemplary embodiments, there is provided a method comprising presenting, on a user equipment, a 3D application including a 3D community that includes an analog object and a virtual screen. Video content of another user equipment is obtained from a video source server, and presented on the virtual screen. Interaction information generated according to an interaction request from the another user equipment is received from a 3D application server, and an object corresponding to the interaction information is rendered in the 3D community according to the interaction information.

According to another aspect of one or more exemplary embodiments, there is provided a user equipment comprising at least one memory and at least one processor that, in conjunction with the at least one memory, is configured to present a 3D application including a 3D community, the 3D community comprising an analog object and a virtual screen. Video content of another user equipment is obtained from a video content server, and presented on the virtual screen. Interaction information generated according to an interaction request from the another user equipment is received from a 3D application server, and an object corresponding to the interaction information is rendered in the 3D community, according to the interaction information.

According to another aspect of one or more exemplary embodiments, there is provided a system comprising a 3D application server, a video source server, a first user equipment, and a second user equipment configured to present a 3D community in a 3D application. The 3D community comprises an analog object and a virtual screen server. The 3D application server comprises at least one memory and at least one processor that, in conjunction with the at least one memory, is configured to obtain, from the video source server, video content uploaded by the first user equipment, and transmit the video content to the second user equipment for presentation on the virtual screen; receive, from the video source server, an information interaction request uploaded by the first user equipment to the video source server; generate interaction information according to the information interaction request; and transmit the interaction information to the second user equipment. The second user equipment comprises at least one memory and at least one processor that, in conjunction with the at least one memory, is configured to receive the interaction information and render, in the 3D community, an object corresponding to the interaction information.

BRIEF DESCRIPTION OF THE DRAWINGS

Exemplary embodiments will be described below with reference to the accompanying drawings, in which.

DETAILED DESCRIPTION

Figure 1:
FIG. 1 is a schematic diagram of an instance in which an anchor controls an environment of a 3D community according to an exemplary embodiment.

Exemplary embodiments provide an information interaction method. An anchor may interact with the audience in a 3D community in a 3D application, thereby increasing the diversity of interaction. The exemplary embodiments further provide a corresponding user equipment, server, and system. Detailed descriptions are separately provided below.

Compared with the related art technology in which an anchor can interact with the audience only by way of words in a two-dimensional manner, the information interaction method provided in the exemplary embodiments enables an anchor to interact with the audience in a 3D community in a 3D application, thereby increasing diversity of interaction.

The following clearly and completely describes the technical solutions in the exemplary embodiments with reference to the accompanying drawings in the exemplary embodiments. The described exemplary embodiments are merely some exemplary embodiments rather than all exemplary embodiments. All other exemplary embodiments obtained by a person of ordinary skill in the art based on the exemplary embodiments without any creative effort shall fall within the protection scope of the present disclosure and the appended claims.

For ease of understanding, the terms used in this application are briefly introduced in advance below:

A 3D application system in the exemplary embodiments may be understood as a 3D game system.

A 3D game is a three-dimensional electronic game based on three-dimensional computer patterns, including, but not limited to, a multiplayer online network 3D game, a single-player 3D game played by a single person, and a virtual reality game established based on a 3D game system, may be generally applied to various platforms, and includes 3D games on a game host platform, a mobile phone game platform, and a personal computer game platform.

A 3D community is a virtual community environment in a 3D game, and is a game environment developed based on three-dimensional computer patterns. The 3D community may include an analog object corresponding to a player in a game, and the 3D community in this application includes a virtual screen. The virtual screen is preferable a big virtual screen similar to outdoor projection.

A game anchor is a person engaged in game report and explanation on the electronic media such as the Internet.

In the present disclosure, a technology of directly displaying, in the 3D community, a live video that is broadcast on the Internet is used, and a communications mechanism is established in the 3D community, to allow an anchor of the live video that is broadcast on the Internet to interact with the audience in the 3D community in various ways. In addition to direct video and audio presentation, the interaction manners further include controlling the weather in the 3D community, letting off fireworks, and so on. For example, at Christmas, the anchor may control the weather in the 3D community to become snowy, and at the same time, let off fireworks in the community, greatly adding the festive atmosphere, and further greatly promoting participation of the audience.

The foregoing describes the process in which an anchor lets off fireworks for the audience in the 3D community. In addition to the fireworks, the anchor may control the weather in the 3D community by using a similar communications mechanism. As shown in FIG. 1, the anchor may control the weather in the 3D community, may set the 3D community to night and light up the illuminations, and so on, greatly enriching the interaction between the anchor and the audience.

Figure 2:
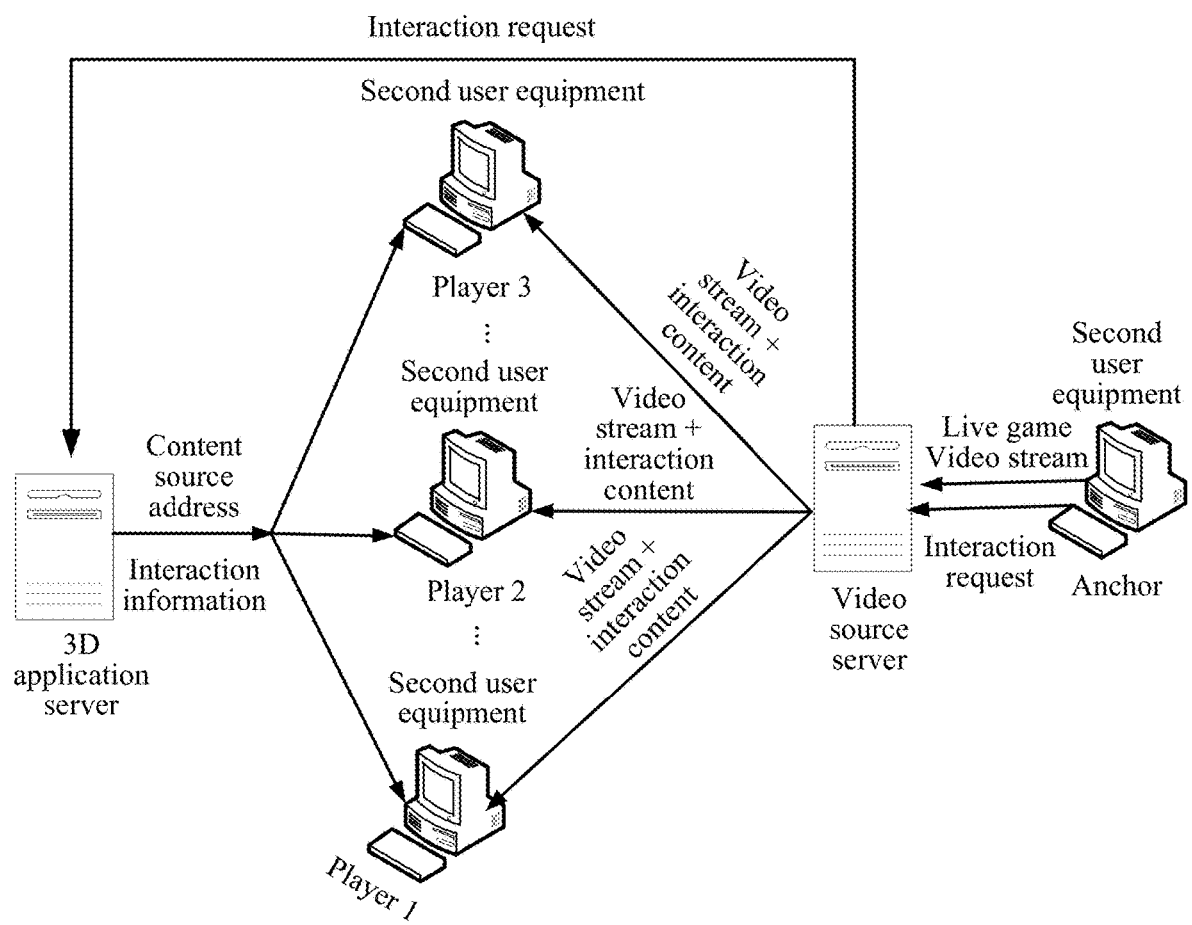
FIG. 2 is a schematic diagram of an exemplary embodiment of a 3D application system according to an exemplary embodiment.

FIG. 2 is a schematic diagram of an exemplary embodiment of a 3D application system according to an exemplary embodiment.

As shown in FIG. 2, the 3D application system provided in this exemplary embodiment includes: a 3D application server, a video source server, a first user equipment used by an anchor, and a second user equipment used by a player. There may be a plurality of second user equipment. The anchor broadcasts a live game by using the first user equipment. A video stream of the broadcast live game is uploaded to the video source server. The anchor is registered in advance with a game server. Therefore, the game server stores a source address of content currently broadcast. The player may further interact with the anchor. As a result, there may further be content of the interaction between the anchor and an analog object in the live broadcasting process. Therefore, a user equipment may obtain the video stream and the interaction content of the live broadcast from a content providing server.

After obtaining the video stream and the interaction content, the second user equipment renders audio and a video, to obtain corresponding audio content and video content, plays the audio content in the 3D application, and presents the video content and the interaction content on the virtual screen.

When the anchor interacts with the audience, an interaction request is sent to the video source server by using the first user equipment. The video source server forwards the interaction request to the 3D application server. The 3D application server generates interaction information according to the interaction request, and sends the interaction information to the second user equipment. The second user equipment renders, according to the interaction information, an object corresponding to the interaction information in the 3D community.

In this exemplary embodiment, the object corresponding to the interaction information may include an analog human object, and may further include an environment object. The environment object may include objects such as the weather, illuminations, and fireworks.

Figure 3:
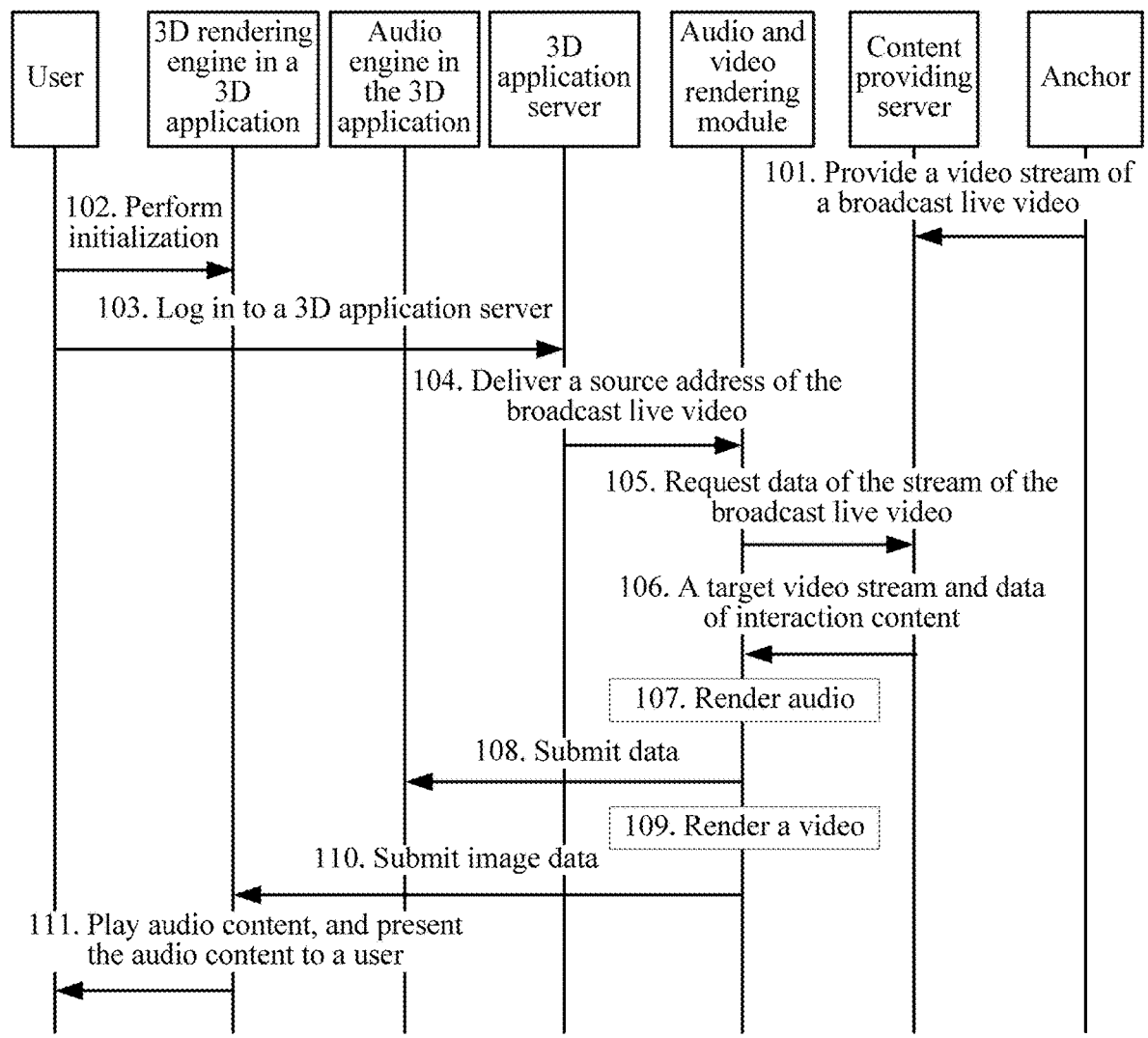
FIG. 3 is a schematic diagram of a process in which video content of live broadcast performed by an anchor is presented on a virtual screen according to an exemplary embodiment.

For a content presentation process on the virtual screen in the 3D community in the 3D application on the second user equipment, reference may be made to FIG. 3 for understanding.

101. An anchor is currently broadcasting a live video on the Internet, and the anchor submits a video stream in the live broadcast to a video stream server by using the first user equipment.

102. After a user opens the 3D application on the second user equipment, a program starts to initialize a 3D rendering engine in the 3D application.

103. The program starts to automatically request a source address of a video currently broadcast by the anchor.

104. The 3D application server delivers the source address of the video to an audio and video rendering module.

105. The audio and video rendering module requests a content providing server for a data stream of the video in the live broadcast.

106. A live video broadcasting server returns the data stream of the video to the audio and video rendering module.

107. The audio and video rendering module renders audio by using audio and video data.

108. The audio and video rendering module submits the audio data to an audio engine in the 3D application.

109. The audio and video rendering module renders images of the video by frame by using the audio and video data.

110. The audio and video rendering module submits image data to the 3D rendering engine in the 3D application.

111. The rendering engine plays the audio content by using rendered static frame data, and presents 3D video images to the user.

Figure 4:
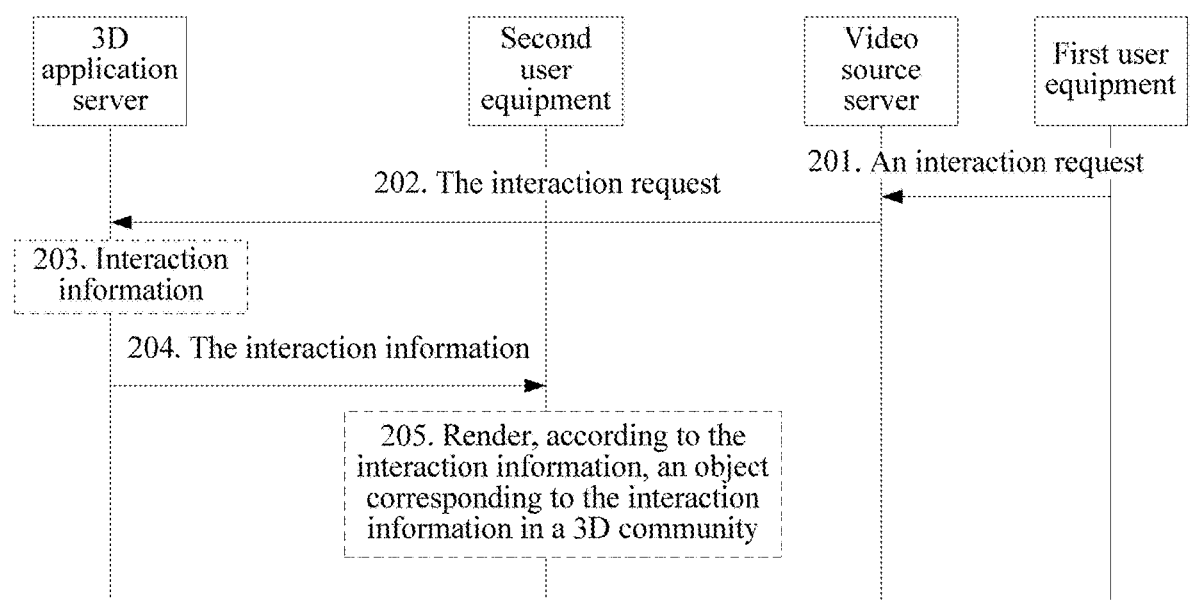
FIG. 4 is a schematic diagram of an exemplary embodiment of an information interaction method according to an exemplary embodiment.

After the video content of the 3D community is rendered, for an interaction process between the anchor and the audience, that is, an exemplary embodiment of information interaction in this exemplary embodiment, reference may be made to FIG. 4 for understanding.

201. A first user equipment reports an interaction request to a video source server.

202. The video source server forwards the interaction request to a 3D application server.

203. The 3D application server generates interaction information according to the interaction request.

204. The 3D application server sends the interaction information to a second user equipment.

205. The second user equipment renders, according to the interaction information, an object corresponding to the interaction information in a 3D community.

In some exemplary embodiments, the interaction request may be a target analog object generation request. The 3D application server generates interaction information of a target analog object according to the target analog object generation request.

The 3D application server sends the interaction information of the target analog object to the second user equipment, the interaction information of the target analog object being used by the second user equipment for rendering the target analog object in the 3D community.

The second user equipment receives the interaction information that is sent by the 3D application server and that is used for rendering a target analog object.

The second user equipment renders the target analog object in the 3D community according to the interaction information used for rendering the target analog object.

In some exemplary embodiments, the target analog object is used for sending a packet to an analog object in the 3D community. In this case, the method further includes:

obtaining, by the 3D application server, a packet sending request from the video source server, where the packet sending request is uploaded by the first user equipment to the video source server;

generating, by the 3D application server, interaction information of the packet according to the packet sending request; and sending, by the 3D application server, the interaction information of the packet to the second user equipment, the interaction information of the packet being used by the second user equipment for rendering the packet on a moving track of the target analog object;

receiving, by the second user equipment, packet information sent by the 3D application server; and rendering, by the second user equipment, the packet on the moving track of the target analog object according to the packet information.

In some exemplary embodiments, the method further includes:

obtaining, by the 3D application server, a packet sending request from the video source server, where the packet sending request is uploaded by the first user equipment to the video source server;

generating, by the 3D application server, interaction information of a packet according to the packet sending request; and sending, by the 3D application server, the interaction information of the packet to the second user equipment, the interaction information of the packet being used by the second user equipment for rendering the packet on a moving track of the target analog object;

receiving, by the second user equipment, packet information sent by the 3D application server; and rendering, by the second user equipment, the packet on a moving track of the target analog object according to the packet information.

In some exemplary embodiments, the method further includes:

when monitoring that the particular analog object in the 3D community obtains the packet sent by the target analog object, sending, by the 3D application server to the second user equipment, a notification message indicating that the packet has been obtained, where the particular analog object is an analog object corresponding to the second user equipment; and when the particular analog object in the 3D community obtains the packet sent by the target analog object, receiving, by the second user equipment, the notification message that is sent by the 3D application server and that indicates that the packet has been obtained, where the particular analog object is the analog object corresponding to the second user equipment.

In some exemplary embodiments, the information interaction request is an environment object rendering request.

The 3D application server generates interaction information of an environment object according to the environment object rendering request.

The 3D application server sends the interaction information of the environment object to the second user equipment, the interaction information of the environment object being used by the second user equipment for rendering the environment object in the 3D community.

The second user equipment receives the interaction information that is sent by the 3D application server and that is used for rendering the environment object.

The second user equipment renders the environment object in the 3D community according to the interaction information used for rendering the environment object.

For ease of understanding, a process in which an anchor sends an envoy to give a gift to an analog object in a 3D community and a process in which the anchor controls the weather in the 3D community are respectively described below by using two exemplary embodiments.

Figure 5:
FIG. 5 is a schematic diagram of an instance in which an anchor gives a gift to a 3D community according to an exemplary embodiment.

FIG. 5 is a schematic diagram showing that an anchor sends an envoy in a 3D community. As shown in FIG. 5, the anchor sends an envoy representing the anchor in the 3D community. The envoy is a target analog object. The envoy may walk in the 3D community, and gives a gift to the analog object in the 3D community.

Figure 6:
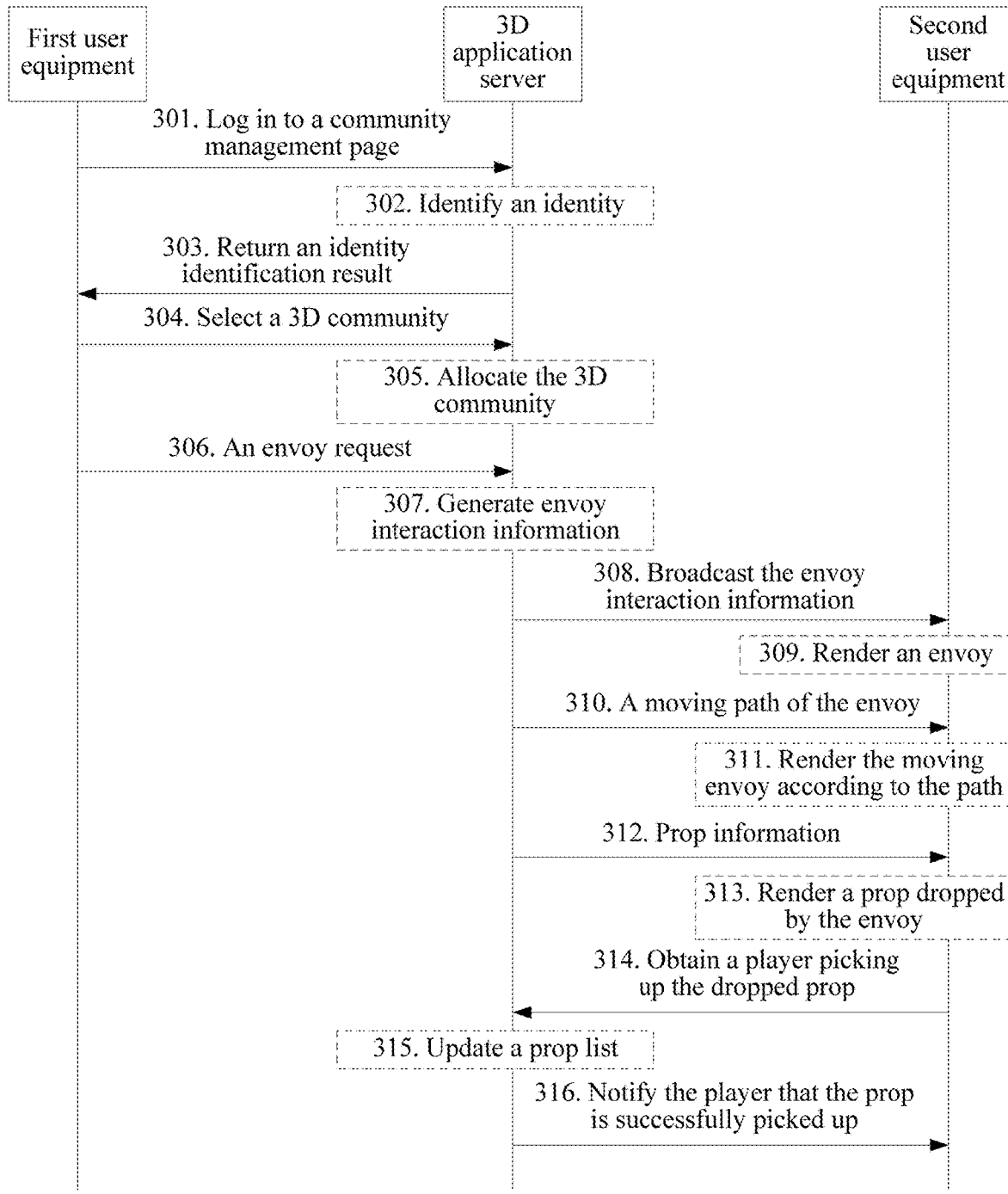
FIG. 6 is a schematic diagram of another exemplary embodiment of an information interaction method according to an exemplary embodiment.

For an interaction process in which the envoy gives a gift, reference may be made to a description of FIG. 6 for understanding.

As shown in FIG. 6, another exemplary embodiment of information interaction provided in the exemplary embodiments includes:

301. An anchor logs in to a community management page by using a first user equipment.

302. A 3D application server identifies an identity of the anchor, to determine whether the anchor is registered and whether the anchor is an authorized anchor.

303. Return an identity identification result after the identification succeeds.

304. The anchor selects a 3D community by using the first user equipment.

305. The 3D application server allocates the selected 3D community to the anchor.

In this application, steps 301 to 305 may be integrating corresponding 3D community page management, 3D community entrance, and 3D community allocation functions on the 3D application server. Alternatively, the functions of the steps 301 to 305 may be implemented by using three independent servers. The three independent servers may include a page management server, a 3D community entrance server, and a 3D community server. The page management server is responsible for displaying a management page and displaying an interface to a user. The 3D community entrance server is responsible for interacting with the page management server and storing data such as anchor information. The 3D community server is responsible for receiving an interaction requirement from the anchor and forwarding the interaction requirement to the 3D application server.

306. The anchor sends an envoy request to the 3D application server by using the first user equipment.

307. The 3D application server generates envoy interaction information according to the envoy request.

308. The 3D application server broadcasts the envoy interaction information to a second user equipment.

309. The second user equipment renders an envoy in the 3D community according to the envoy interaction information.

310. The 3D application server sends a moving path of the envoy to the second user equipment.

311. The second user equipment renders the moving envoy according to the moving path of the envoy.

312. The 3D application server sends prop information to the second user equipment.

In addition a prop, the envoy may further drop other gifts. A packet in this application may include a prop and may further include other gifts.

313. The second user equipment renders, according to the prop information, the prop dropped by the envoy.

314. Obtain a player picking up the dropped prop.

315. Update a prop list.

316. Notify the player that the prop is successfully picked up.

According to the foregoing description, this application implements a set of automatic virtual interesting gift-giving system, greatly improving interaction between the user and the anchor in the virtual community.

A process in which an anchor controls the weather in a 3D community in this application is described below with reference to FIG. 7.

Figure 7:
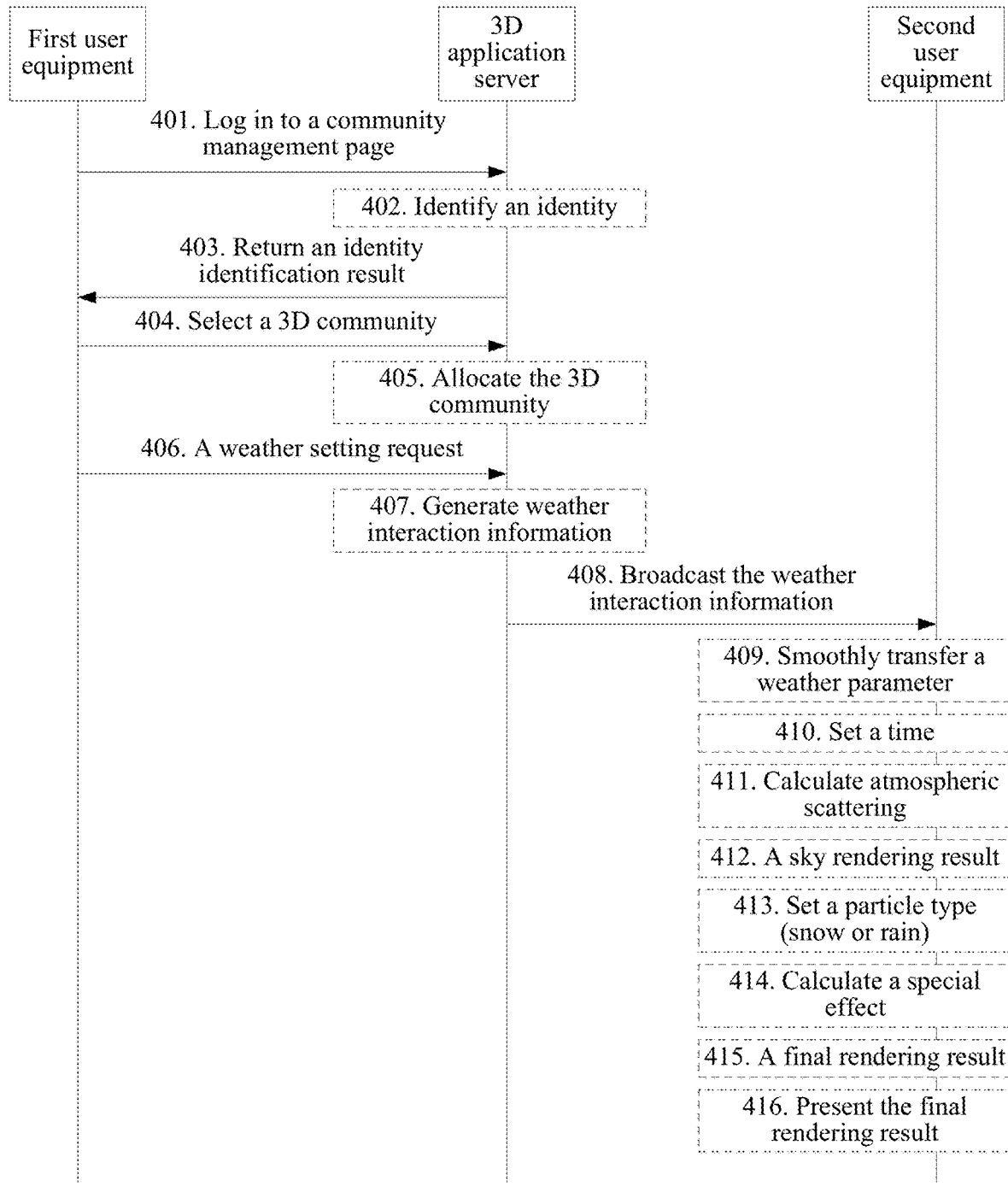
FIG. 7 is a schematic diagram of another exemplary embodiment of an information interaction method according to an exemplary embodiment.

As shown in FIG. 7, another exemplary embodiment of information interaction provided in the exemplary embodiments includes:

401. An anchor logs in to a community management page by using a first user equipment.

402. A 3D application server identifies an identity of the anchor, to determine whether the anchor is registered and whether the anchor is an authorized anchor.

403. Return an identity identification result after the identification succeeds.

404. The anchor selects a 3D community by using the first user equipment.

405. The 3D application server allocates the selected 3D community to the anchor.

401 to 405 are the same as 301 to 305 in the foregoing exemplary embodiment.

406. The anchor sends a weather setting request to the 3D application server by using the first user equipment.

407. The 3D application server generates weather interaction information according to the weather setting request.

408. The 3D application server broadcasts the weather interaction information to a second user equipment.

409. The second user equipment filters a weather parameter according to the weather interaction information.

A 3D rendering engine first performs linear transition on a related coefficient in the weather parameter, to avoid that a user in the 3D community feels wired.

410. The second user equipment sets a time of a weather change.

411. The second user equipment calculates atmospheric scattering.

The atmospheric scattering is calculated according to the set time. The color of the sky is determined according to the atmospheric scattering. Therefore, the color of the sky is rendered by using the Mie-Rayleigh algorithm.

412. The second user equipment determines a weather rendering result.

413. The second user equipment sets a particle type (rain or snow).

The rain or snow is rendered according to the set particle type. Herein, a valve textures file (VTF) feature of a graphic processing unit (GPU) is used. Calculation on rain and snow particle locations is directly completed in the GPU, and the rain and snow particle locations are directly rendered in a same batch.

414. The second user equipment calculates an special effect.

415. The second user equipment determines a final rendering result.

416. The second user equipment presents the final rendering result.

Another process such as an interaction process of letting off fireworks in the 3D community is basically consistent with the process of FIG. 7. The only difference is that an effect of the fireworks is rendered according to firework interaction information.

The foregoing describes the information interaction method. The following describes devices in the exemplary embodiments with reference to the accompanying drawings.

Figure 8:
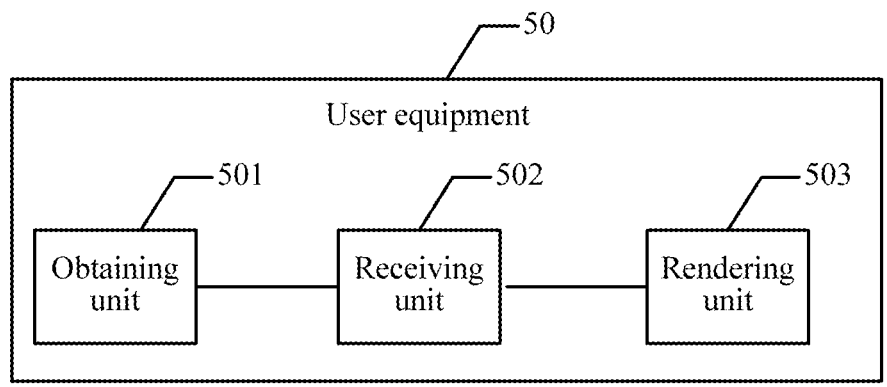
FIG. 8 is a schematic diagram of an exemplary embodiment of a user equipment according to an exemplary embodiment.

Referring to FIG. 8, a user equipment provided in an exemplary embodiment is a second user equipment in a 3D application system. The 3D application system includes: a 3D application server, a video source server, a first user equipment, and the second user equipment. The first user equipment is configured to respond to an interaction operation of an anchor. A 3D community in a 3D application presented by the second user equipment includes an analog object and a virtual screen that is used for watching video content by the analog object. The user equipment 50 includes:

an obtaining unit 501, configured to: obtain, from the video source server, video content uploaded by the first user equipment, and present the video content on the virtual screen;

a receiving unit 502, configured to receive, after the obtaining unit 501 obtains the video content, interaction information sent by the 3D application server, the interaction information being generated by the 3D application server according to an interaction request that is uploaded by the first user equipment to the video source server; and a rendering unit 503, configured to render, according to the interaction information received by the receiving unit 502, an object corresponding to the interaction information in the 3D community.

In the user equipment 50 provided in this exemplary embodiment, the obtaining unit 501 obtains, from the video source server, the video content that is uploaded by the first user equipment and that is broadcast by the anchor, and presents the video content on the virtual screen. The receiving unit 502 receives, after the obtaining unit 501 obtains the video content, the interaction information sent by the 3D application server, the interaction information being generated by the 3D application server according to the interaction request that is uploaded by the first user equipment to the video source server. The rendering unit 503 renders, according to the interaction information received by the receiving unit 502, the object corresponding to the interaction information in the 3D community. Compared with the related art technology in which an anchor may interact with the audience only by way of words in a two-dimensional manner, the user equipment provided in this exemplary embodiment may enable an anchor to interact with the audience in the 3D community in the 3D application, thereby increasing diversity of interaction.

In some exemplary embodiments, the receiving unit 502 is configured to receive the interaction information that is sent by the 3D application server and that is used for rendering a target analog object.

The rendering unit 503 is configured to render the target analog object in the 3D community according to the interaction information that is received by the receiving unit 502 and that is used for rendering the target analog object.

In some exemplary embodiments, the target analog object is used for sending a packet to the analog object in the 3D community. In this case, the receiving unit 502 is further configured to receive packet information sent by the 3D application server.

The rendering unit 503 is configured to render the packet on a moving track of the target analog object according to the packet information.

In some exemplary embodiments, the receiving unit 502 is further configured to: when the analog object in the 3D community obtains the packet sent by the target analog object, receive a notification message that is sent by the 3D application server and that indicates that the packet has been obtained by the analog object.

In some exemplary embodiments, the receiving unit 502 is configured to receive the interaction information that is sent by the 3D application server and that is used for rendering an environment object.

The rendering unit 503 is configured to render the environment object in the 3D community according to the interaction information that is received by the receiving unit 502 and that is used for rendering the environment object.

Figure 9:
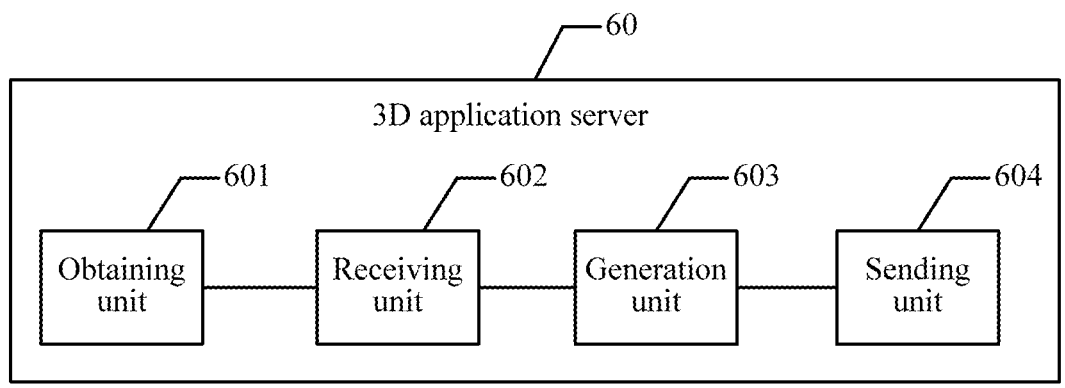
FIG. 9 is a schematic diagram of an exemplary embodiment of a 3D application server according to an exemplary embodiment.

Referring to FIG. 9, a 3D application server 60 provided in an exemplary embodiment is applied to a 3D application system. The 3D application system further includes: a video source server, a first user equipment, and a second user equipment. The first user equipment is configured to respond to an interaction operation of an anchor. A 3D community in a 3D application presented by the second user equipment includes an analog object and a virtual screen that is used for watching, by the analog object, video content broadcast by the anchor. The 3D application server includes:

an obtaining unit 601, configured to: obtain, from the video source server, video content uploaded by the first user equipment; and send the uploaded video content to the second user equipment, to present the video content on the virtual screen of the second user equipment;

a receiving unit 602, configured to receive an information interaction request from the video source server, the information interaction request being uploaded by the first user equipment to the video source server;

a generation unit 603, configured to generate interaction information according to the information interaction request received by the receiving unit 602; and a sending unit 604, configured to send the interaction information generated by the generation unit 603 to the second user equipment, the interaction information being used by the second user equipment for rendering an object corresponding to the interaction information in the 3D community.

In this exemplary embodiment, the obtaining unit 601 obtains, from the video source server, the video content uploaded by the first user equipment; and sends the uploaded video content to the second user equipment, to present the video content on the virtual screen of the second user equipment. The receiving unit 602 receives the information interaction request from the video source server, the information interaction request being uploaded by the first user equipment to the video source server. The generation unit 603 generates the interaction information according to the information interaction request received by the receiving unit 602. The sending unit 604 is configured to send the interaction information generated by the generation unit 603 to the second user equipment, the interaction information being used by the second user equipment for rendering the object corresponding to the interaction information in the 3D community. Compared with the related art technology in which an anchor may interact with the audience only by way of words in a two-dimensional manner, the 3D application server provided in this exemplary embodiment may enable an anchor to interact with the audience in the 3D community in the 3D application, thereby increasing diversity of interaction.

In some exemplary embodiments, the information interaction request is a target analog object generation request. The generation unit 603 is configured to generate interaction information of a target analog object according to the target analog object generation request.

The sending unit 604 is configured to send the interaction information of the target analog object to the second user equipment, so that the second user equipment renders the target analog object in the 3D community in response to the interaction information of the target analog object.

In some exemplary embodiments, the receiving unit 602 is further configured to receive a packet sending request from the video source server, where the packet sending request is uploaded by the first user equipment to the video source server.

The generation unit 603 is further configured to generate interaction information of a packet according to the packet sending request.

The sending unit 604 is further configured to send the interaction information of the packet to the second user equipment, so that the second user equipment renders the packet on a moving track of the target analog object in response to the interaction information of the packet.

Figure 10:
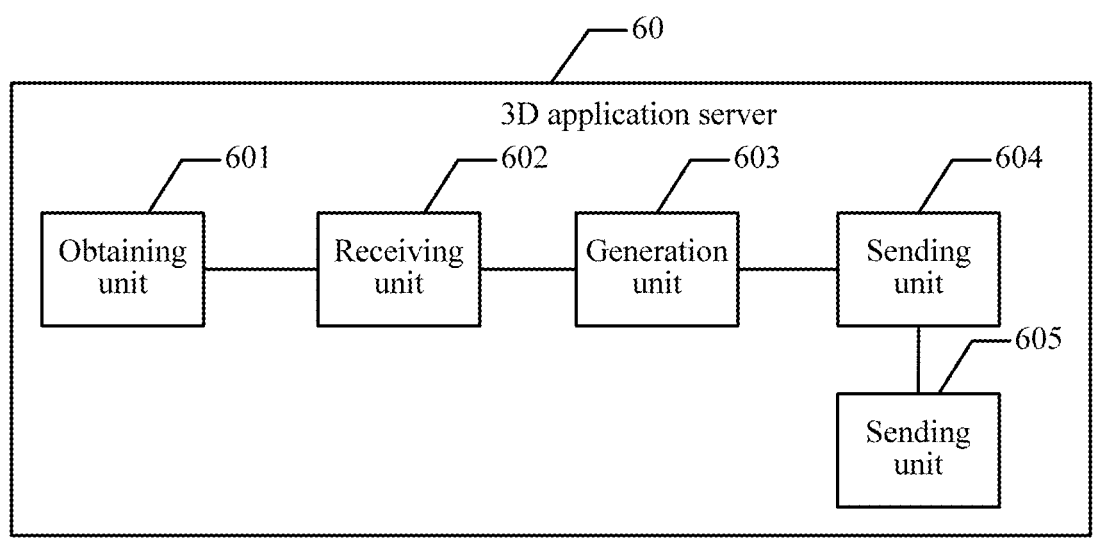
FIG. 10 is a schematic diagram of another exemplary embodiment of a 3D application server according to an exemplary embodiment.

In some exemplary embodiments, referring to FIG. 10, the 3D application server provided in this exemplary embodiment further includes a monitoring unit 605.

The monitoring unit 605 is configured to monitor that the analog object in the 3D community obtains the packet sent by the target analog object.

The sending unit 604 is configured to: when the monitoring unit 605 monitors that the analog object in the 3D community obtains the packet sent by the target analog object, send, to the second user equipment, a notification message indicating that the packet has been obtained by the analog object.

In some exemplary embodiments, the information interaction request is an environment object rendering request. The generation unit 603 is configured to generate interaction information of an environment object according to the environment object rendering request.

The sending unit 604 is configured to send the interaction information of the environment object to the second user equipment, so that the second user equipment renders the environment object in the 3D community in response to the interaction information of the environment object.

For descriptions of the foregoing user equipment and 3D application server, reference may be made to related descriptions of FIG. 1 to FIG. 7 for understanding, and no excessive detail is described herein.

Figure 11:
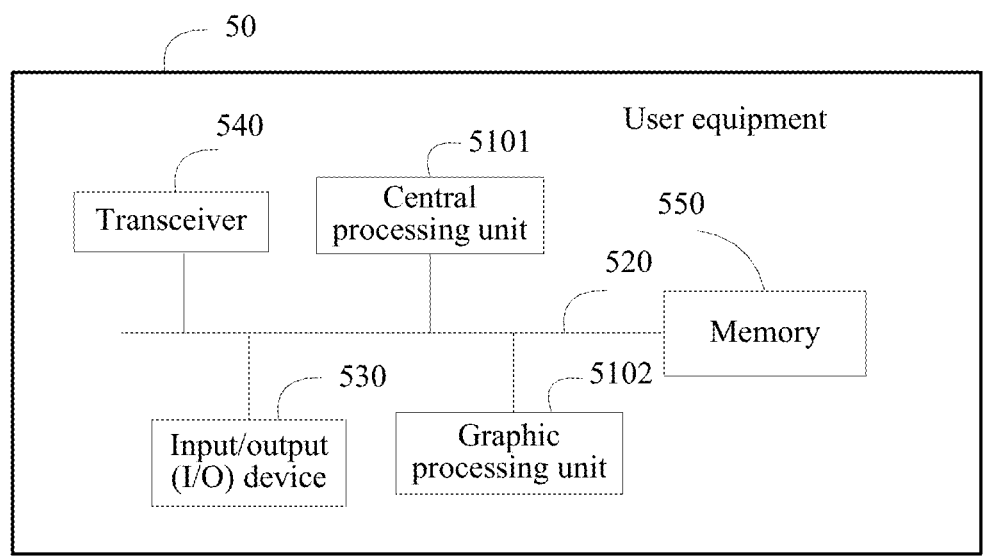
FIG. 11 is a schematic diagram of another exemplary embodiment of a user equipment according to an exemplary embodiment.

FIG. 11 is a schematic structural diagram of a user equipment 50 according to an exemplary embodiment. The user equipment 50 is a second user equipment in a 3D application system. The 3D application system includes: a 3D application server, a video source server, a first user equipment, and the second user equipment. The first user equipment is configured to respond to an interaction operation of an anchor. A 3D community in a 3D application presented by the second user equipment includes an analog object and a virtual screen that is used for watching video content by the analog object. The user equipment 50 in this application includes a central processing unit (CPU) 5101, a graphic processing unit (GPU) 5102, a transceiver 540, a memory 550, and an input/output (I/O) device 530. The input/output (I/O) device 530 may be keyboard or a mouse. The graphic processing unit 5102 is configured to render a graph. The memory 550 may include a read-only memory and a random access memory, and is configured to provide operation instructions and data for the processor 510. A part of the memory 550 may further include a non-volatile random access memory (NVRAM).

In some implementations, the memory 550 stores the following element: an executable module, or a data structure, or a subset thereof, or an extended set thereof.

In this exemplary embodiment, by invoking the operation instructions (the operation instructions may be stored in an operating system) stored by the memory 550, the transceiver 540 is configured to: obtain, from the video source server, the video content that is uploaded by the first user equipment and that is broadcast by the anchor, and present the video content on the virtual screen; receive the interaction information sent by the 3D application server, the interaction information being generated by the 3D application server according to an interaction request that is uploaded by the first user equipment to the video source server; and the graphic processing unit 5102 configured to render, according to the interaction information, an object corresponding to the interaction information in the 3D community.

Compared with the related art technology in which an anchor may interact with the audience only by way of words in a two-dimensional manner, the user equipment provided in this exemplary embodiment may enable an anchor to interact with the audience in the 3D community in the 3D application, thereby increasing diversity of interaction.

The central processing unit 5101 controls an operation of the user equipment 50. The memory 550 may include a read-only memory and a random access memory, and provide instructions and data to the central processing unit 5101. A part of the memory 550 may further include a non-volatile random access memory (NVRAM). In a specific application, all components of the user equipment 50 are coupled by using a bus system 520, and besides a data bus, the bus system 520 may further include a power bus, a control bus, a state signal bus, and the like. However, for clarity of description, all types of buses in the figure are marked as the bus system 520.

The method disclosed in the foregoing exemplary embodiments may be applied to the processor 510, or may be implemented by the processor 510. The processor 510 may be an integrated circuit chip and has a signal processing capability. In an implementation process, steps of the foregoing methods may be implemented through a hardware integrated logical circuit in the processor 510, or instructions in the form of software. The processor 510 may be a general-purpose processor, a digital signal processor (DSP), an application-specific integrated circuit (ASIC), a field programmable gate array (FPGA) or another programmable logic component, a discrete gate or a transistor logic device, or a discrete hardware component, and may implement or perform the methods, steps, and logical block diagrams disclosed in the exemplary embodiments. The general-purpose processor may be a micro-processor, or the processor may be any conventional processor or the like. The steps of the methods disclosed in the exemplary embodiments may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 550, and the processor 510 reads information in the memory 550 and performs the steps of the foregoing methods in combination with hardware of the processor.

In some exemplary embodiments, the transceiver 540 is configured to receive the interaction information that is sent by the 3D application server and that is used for rendering the target analog object, where the target analog object is used for sending a packet to the analog object in the 3D community.

The image processor 5102 is configured to render the target analog object in the 3D community according to the interaction information used for rendering the target analog object.

In some exemplary embodiments, the transceiver 540 is configured to receive packet information sent by the 3D application server.

The image processor 5102 configured to render the packet on a moving track of the target analog object according to the packet information.

In some exemplary embodiments, the transceiver 540 is configured to: when the particular analog object in the 3D community obtains the packet sent by the target analog object, receive a notification message that is sent by the 3D application server and that indicates that the packet has been obtained, where the particular analog object is an analog object corresponding to the second user equipment.

In some exemplary embodiments, the transceiver 540 is configured to receive the interaction information that is sent by the 3D application server and that is used for rendering an environment object.

The image processor 5102 is configured to render the environment object in the 3D community according to the interaction information used for rendering the environment object.

For understanding of the user equipment 50, reference may be made to related descriptions of FIG. 1 to FIG. 7, and no excessive detail is not described herein.

Figure 12:
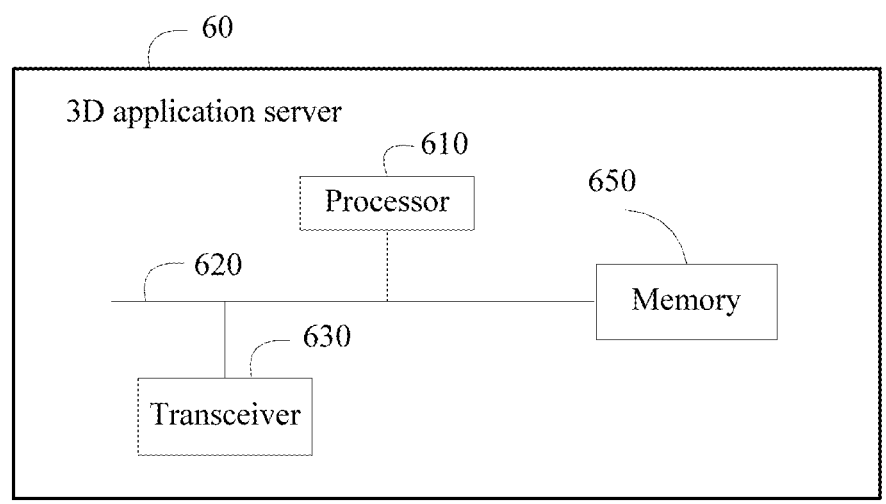
FIG. 12 is a schematic diagram of another exemplary embodiment of a 3D application server according to an exemplary embodiment.

FIG. 12 is a structural schematic diagram of a 3D application server 60 according to an exemplary embodiment. The 3D application server 60 is applied to a 3D application system. The 3D application system further includes: a video source server, a first user equipment, and a second user equipment. The first user equipment is configured to respond to an interaction operation of an anchor. A 3D community in a 3D application presented by the second user equipment includes an analog object and a virtual screen that is used for watching, by the analog object, video content broadcast by the anchor. The 3D application server 60 includes a processor 610, a memory 650, and a transceiver 630. The memory 650 may include a read-only memory and a random access memory, and provide operation instructions and data for the processor 610. A part of the memory 650 may further include a non-volatile random access memory (NVRAM).

In some implementations, the memory 650 stores the following element: an executable module, or a data structure, or a subset thereof, or an extended set thereof.

In this exemplary embodiment, by invoking the operation instructions (the operation instructions may be stored in an operating system) stored by the memory 650, the transceiver 630 is configured to obtain an information interaction request from the video source server, the information interaction request being uploaded by the first user equipment to the video source server;

the processor 610 is configured generate interaction information according to the information interaction request; and the transceiver 630 is further configured to: obtain, from the video source server, video content uploaded by the first user equipment; send the uploaded video content to the second user equipment; and send the interaction information to the second user equipment, the interaction information being used by the second user equipment for rendering an object corresponding to the interaction information in the 3D community.

Compared with the related art technology in which an anchor may interact with the audience only by way of words in a two-dimensional manner, the 3D application server provided in this exemplary embodiment may enable an anchor to interact with the audience in the 3D community in the 3D application, thereby increasing diversity of interaction.

The processor 610 controls an operation of the 3D application server 60, and the processor 610 may also be referred to as a central processing unit (CPU). The memory 650 may include a read-only memory and a random access memory, and provide instructions and data for the processor 610. A part of the memory 650 may further include a non-volatile random access memory (NVRAM). In a specific application, all components of the 3D application server 60 are coupled by using a bus system 620, and in addition to a data bus, the bus system 620 may further include a power bus, a control bus, a state signal bus, and the like. However, for clarity of description, all types of buses in the figure are marked as the bus system 620.

The method disclosed in the foregoing exemplary embodiments may be applied to the processor 610, or may be implemented by the processor 610. The processor 610 may be an integrated circuit chip and has a signal processing capability. In an implementation process, steps of the foregoing methods may be implemented through a hardware integrated logical circuit in the processor 610, or instructions in the form of software. The processor 610 may be a general-purpose processor, a digital signal processor (DSP), an application-specific integrated circuit (ASIC), a field programmable gate array (FPGA) or another programmable logic component, a discrete gate or a transistor logic device, or a discrete hardware component, and may implement or perform the methods, steps, and logical block diagrams disclosed in the exemplary embodiments. The general-purpose processor may be a micro-processor, or the processor may be any conventional processor or the like. The steps of the methods disclosed in the exemplary embodiments may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 650, and the processor 610 reads information in the memory 650 and performs the steps of the foregoing methods in combination with hardware of the processor.

In some exemplary embodiments, the processor 610 is configured to: when the information interaction request is a target analog object generation request, generate interaction information of a target analog object according to the target analog object generation request.

The transceiver 630 is further configured to send the interaction information of the target analog object to the second user equipment, the interaction information of the target analog object being used by the second user equipment for rendering the target analog object in the 3D community.

In some exemplary embodiments, the transceiver 630 is further configured to receive a packet sending request from the video source server, where the packet sending request is uploaded by the first user equipment to the video source server.

The processor 610 is further configured to generate interaction information of the packet according to the packet sending request.

The transceiver 630 is further configured to send the interaction information of the packet to the second user equipment, the interaction information of the packet being used by the second user equipment for rendering the packet on a moving track of the target analog object.

In some exemplary embodiments, the processor 610 is further configured to monitor that the particular analog object in the 3D community obtains the packet sent by the target analog object.

The transceiver 630 is further configured to: when it is monitored that the particular analog object in the 3D community obtains the packet sent by the target analog object, send, to the second user equipment, a notification message indicating that the packet has been obtained, where the particular analog object is an analog object corresponding to the second user equipment.

In some exemplary embodiments, the processor 610 configured to: when the information interaction request is an environment object rendering request, generate interaction information of an environment object according to the environment object rendering request.

The transceiver 630 further configured to send the interaction information of the environment object to the second user equipment, the interaction information of the environment object being used by the second user equipment for rendering the environment object in the 3D community.

For the 3D application server 60, reference may be made to related descriptions of FIG. 1 to FIG. 7 for understanding, and no excessive detail is not described herein.

A person of ordinary skill in the art may understand that all or some of the steps of the methods in the exemplary embodiments may be implemented by a program instructing relevant hardware. The program may be stored in a computer readable storage medium. The storage medium may include: a ROM, a RAM, a magnetic disk, an optical disc, or the like.

The information interaction method, the user equipment, the 3D application server, and the system provided in the exemplary embodiments are described above in detail. Although the principles and implementations of the present disclosure are described by using specific examples in this specification, the descriptions of the foregoing exemplary embodiments are merely intended to help understand the method and the core idea thereof of the present disclosure. Meanwhile, a person of ordinary skill in the art may make modifications to both the specific implementations and the application scope according to the idea of the present disclosure. In conclusion, the content of this specification should not be construed as a limitation to the present disclosure.

What is claimed is:

1. A method comprising:
presenting, on a second user equipment used by a member of a three-dimensional (3D) community, a 3D application rendering the 3D community that comprises a virtual screen and a character object of the member;
obtaining, by the second user equipment from a video source server, live video content of a first user equipment used by an anchor of the 3D community, the live video content being from the anchor, and presenting the live video content on the virtual screen rendered within the 3D community;
receiving, by the second user equipment from a 3D application server, interaction information generated according to an interaction request from the first user equipment used by the anchor; and
rendering, by the second user equipment according to the interaction information, an object in the 3D community, the rendered object corresponding to the interaction information.

2. The method according to claim 1, wherein the interaction information is for rendering a character object of the anchor in the 3D community; and
the rendering the object in the 3D community corresponding to the interaction information comprises rendering the character object of the anchor in the 3D community according to the interaction information.

3. The method according to claim 2, wherein the character object of the anchor is for sending a packet to the character object of the member in the 3D community; and
the method further comprises:
receiving, by the second user equipment, packet information from the 3D application server; and
rendering, by the second user equipment, the packet on a moving track of the character object of the anchor according to the packet information.

4. The method according to claim 3, further comprising:
in response to the character object of the member in the 3D community obtaining the rendered packet, receiving, by the second user equipment from the 3D application server, a notification message that the packet has been obtained by the character object of the member.

5. The method according to claim 1, wherein the interaction information is for rendering an environment object of an environment of the 3D community; and
the rendering the object in the 3D community corresponding to the interaction information comprises rendering the environment object in the 3D community according to the interaction information.

6. The method according to claim 1, wherein the 3D application is a 3D game application and the 3D community is a 3D game community of a 3D game being played by a plurality of players, and
the member and the anchor are included in the 3D community but are not playing in the 3D game.

7. A user equipment comprising at least one memory and at least one processor that, in conjunction with the at least one memory, is configured to:
present a three-dimensional (3D) application that renders a 3D community, comprising a virtual screen and a character object of a member of the 3D community that uses the user equipment;
obtain, from a video source server, live video content of another user equipment used by an anchor of the 3D community, the live video content being from the anchor, and present the live video content on the virtual screen rendered in the 3D community;
receive, from a 3D application server, interaction information generated according to an interaction request from the another user equipment used by the anchor; and
render, according to the interaction information, an object in the 3D community, the object corresponding to the interaction information.

8. The user equipment according to claim 7, the interaction information is for rendering a character object of the anchor in the 3D community; and
the rendering the object corresponding to the interaction information comprises rendering the character object of the anchor in the 3D community according to the interaction information.

9. The user equipment according to claim 8, wherein the character object of the anchor is for sending a packet to the character object of the member in the 3D community; and
the at least one processor is further configured to:
receive packet information from the 3D application server; and
render the packet on a moving track of the character object of the anchor according to the packet information.

10. The user equipment according to claim 9, wherein
in response to the character object of the member in the 3D community obtaining the rendered packet, the at least one processor is further configured to receive, from the 3D application server, a notification message that the packet has been obtained by the character object of the member.

11. The user equipment according to claim 7, wherein the interaction information is for rendering an environment object of an environment of the 3D game; and the rendering the object corresponding to the interaction information comprises rendering the environment object in the 3D community according to the interaction information.

12. The user equipment according to claim 7, wherein the 3D application is a 3D game application and the 3D community is a 3D game community of a 3D game being played by a plurality of players, and the member and the anchor are included in the 3D community but are not playing in the 3D game.

13. A system comprising:

a 3D application server;

a video source server;

a first user equipment used by an anchor of a three-dimensional (3D) community; and a second user equipment used by a character object of a member of the 3D community and configured to present a 3D application rendering the 3D community comprising a virtual screen and a character object of the member of the 3D community, wherein the 3D application server comprises at least one memory and at least one processor that, in conjunction with the at least one memory, is configured to:

obtain, from the video source server, live video content uploaded by the first user equipment used by the anchor of the 3D community, the live video content being from the anchor of the 3D community, and transmit the live video content to the second user equipment for presentation on the virtual screen;

receive, from the video source server, an information interaction request uploaded by the first user equipment used by the anchor, to the video source server;

generate interaction information according to the information interaction request; and transmit the interaction information to the second user equipment, and wherein the second user equipment comprises at least one memory and at least one processor that, in conjunction with the at least one memory, is configured to receive the interaction information and render an object in the 3D community, the object corresponding to the interaction information.

14. The system according to claim 13, wherein:

the information interaction request is a request for generating a character object of the anchor;

the 3D application server is configured to generate interaction information for rendering the character object of the anchor in the 3D community according to the request;

the 3D application server is configured to transmit the interaction information of the character object of the anchor to the second user equipment; and the second user equipment is configured to render the character object of the anchor in the 3D community in response to the interaction information.

15. The system according to claim 14, wherein the 3D application server is further configured to:

receive a packet sending request from the video source server that is uploaded by the first user equipment used by the anchor, to the video source server;

generate interaction information of a packet according to the packet sending request; and transmit the interaction information of the packet to the second user equipment used by the member of the 3D community, and wherein the second user equipment is configured to render the packet on a moving track of the character object of the anchor in response to the interaction information of the packet.

16. The system according to claim 15, wherein the at least one processor of the 3D application server is further configured to monitor whether the character object of the member in the 3D community obtains the packet; and in response to the packet being obtained by the character object of the member in the 3D community, transmit, to the second user equipment, a notification message indicating that the packet has been obtained by the character object of the member.

17. The system according to claim 13, wherein:

the information interaction request is an environment object rendering request;

the 3D application server is configured to:

generate interaction information of an environment object of an environment of the 3D game according to the environment object rendering request; and transmit the interaction information of the environment object to the second user equipment, and the second user equipment is configured to render the environment object of the environment in the in the 3D community in response to the interaction information of the environment object.

18. The system according to claim 13, wherein the 3D application is a 3D game application and the 3D community is a 3D game community of a 3D game being played by a plurality of players, and the member and the anchor are included in the 3D community but are not playing in the 3D game.

* * * * *